United States Patent [19]
Koda et al.

[11] 3,961,977
[45] June 8, 1976

[54] COATING COMPOSITION AND PROCESS FOR PRODUCING COATED ARTICLES

[75] Inventors: Hiroyuki Koda, Toyonaka; Toshiaki Izumita, Amagasaki; Shiro Gomyo; Yoshio Inoue, both of Annaka, all of Japan

[73] Assignee: Mitsubishi Gas Chemical Company, Inc., Tokyo, Japan

[22] Filed: Feb. 16, 1973

[21] Appl. No.: 333,189

[30] Foreign Application Priority Data
Feb. 17, 1972   Japan.............................. 47-16044

[52] U.S. Cl...................... 106/287 SB; 106/287 SE
[51] Int. Cl.$^2$............................................ C07F 7/10
[58] Field of Search................ 106/287 SB, 287 SE; 260/46.5 E, 448.2 N, 2 S; 117/126 GN, 126 GS, 124 E

[56] References Cited
UNITED STATES PATENTS

| | | | |
|---|---|---|---|
| 3,472,729 | 10/1969 | Sterman...................... | 117/126 GS |
| 3,591,408 | 7/1971 | Marzucchi.................... | 117/126 GS |
| 3,837,876 | 9/1974 | Mayuzumi...................... | 260/46.5 E |

*Primary Examiner*—Theodore Morris
*Attorney, Agent, or Firm*—Johnson, Dienner, Emrich & Wagner

[57] ABSTRACT

A transparent and scratch resistant coating composition is disclosed, together with a process for producing the composition and applying it to molded articles, wherein the composition comprises a partially hydrolyzed carbon-functional silane derived from an aminoalkylalkoxysilane and an epoxyalkylalkoxysilane, and is applied as a coating to the surface of a plastic article which is thereafter heated and dried.

4 Claims, No Drawings

COATING COMPOSITION AND PROCESS FOR PRODUCING COATED ARTICLES

BACKGROUND OF THE INVENTION

Transparent plastic articles, for example, molded articles of amorphous thermoplastic resins, such as polycarbonate, polymethyl methacrylate, cellulose butyrate, polyvinyl chloride an polystyrene, have heretofore been considered to be applicable, in various fields, as substitutes for glass articles because of their transparency and light weight thereof. However, they are easily scratched and tend to lose the transparency. Therefore, they are actually utilized for limited applications. Consideration has been given to eliminating such undesirable characteristics of plastic articles by forming a transparent protective layer on the surface of the articles by the use of coating materials, but the conventional coating materials did not result in sufficient improvement.

For instance, the specification of U.S. Pat. No. 3,451,838 proposes coating the surface of an acrylic resin or polycarbonate resin molded article with a composition comprising a mixture of methyltriethoxysilane and phenyltriethoxysilane and then effecting the curing. However, surface-coated plastic articles obtained according to this method are inferior as to scratch resistance, and hence, their uses are still limited.

BRIEF SUMMARY OF THE INVENTION

This invention relates to a coating composition for application to the surface of a thermoplastic resin-molded article which provides a transparent coating layer possessing scratch resistant and antistatic properties, and, moreover, to a process for producing the molded articles having a coating layer made by the application of the coating composition.

We have done extensive research work with a view to providing a method capable of overcoming this fatal defect of conventional plastic articles, i.e., the poor resistance against an abrasion or a scratch, and, as a result, we have now found that when a partially-hydrolyzed carbon-functional silane derived from an aminoalkylalkoxysilane and an epoxyalkylalkoxysilane, which will be detailed hereinafter, is coated on the surface of a plastic article, and then the coated article is heated and dried, the resulting protective coating layer exhibits a very high resistance against an abrasion and is seldom scratched.

We made similar experiments on combinations of aminoalkylalkoxysilanes with acryloxyalkylalkoxysilanes or vinylalkoxysilanes, and combinations of epoxyalkylalkoxysilanes with acryloxyalkylalkoxysilanes or vinylalkoxylanes, and found that in these experiments the resulting protective coating layers were extremely poor in the scratch resistance. Thus, it is a very peculiar fact that only a combination of an aminoalkylalkoxysilane and an epoxyalkylalkoxysilane to be used in this invention can give good results. Based on the foregoing finding, we have now completed this invention.

The objects of this invention are accomplished by the use of a partially hydrolyzed carbon-functional silane derived from an aminoalkylalkoxysilane and an epoxyalkylalkoxysilane as a coating composition. The coating compositions of this invention generally comprise organic solvent solutions of the partially-hydrolyzed carbon-functional silane.

DETAILED DESCRIPTION

The partially-hydrolyzed carbon-functional silane used in this invention is produced by effecting a carbon-functional silane with water in a smaller amount than the one calculated stoichiometrically to hydrolyze the carbon-functional silane into the corresponding silanol. The carbon-functional silane above-mentioned is defined as being a member selected from the group consisting of (a) a mixture of an aminoalkylalkoxysilane and an epoxyalkylalkoxysilane and (b) a reaction product thereof, wherein the reaction product may be meant to be a compound obtained by effecting the amine group in the aminoalkylalkoxysilane with the epoxy group in the epoxyalkylalkoxysilane.

Aminoalkylalkoxysilanes adapted for the carbon-functional silane of this invention include the following compounds represented by a formula (I)

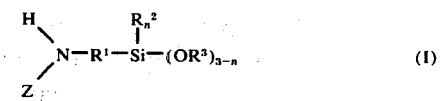

wherein $R^1$ stands for a divalent hydrocarbon group having 1 to 4 carbon atoms, $R^2$ and $R^3$ designate a monovalent hydrocarbon group having 1 to 4 carbon atoms, Z stands for a hydrogen atom or an aminoalkyl group, and n is 0 or 1.

Examples of these compounds are aminomethyltriethyoxysilane $NH_2CH_2Si(OC_2H_5)_3$, N-β-aminoethylaminomethyltrimethoxysilane $NH_2CH_2CH_2NHCH_2Si(OCH_3)_3$, γ-aminopropyltriethoxysilane $NH_2CH_2CH_2CH_2Si(OC_2H_5)_3$, N-(trimethoxysilylpropyl)-ethylene diamine $NH_2CH_2CH_2NH$-$CH_2CH_2CH_2Si(OCH_3)_3$, N-(dimethoxymethylsilylpropyl)-ethylene diamine

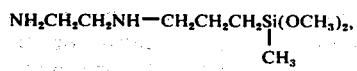

etc.

Epoxyalkylalkoxysilanes adapted as the other component of the carbon-functional silane of this invention include the following compounds represented by a formula (II)

wherein $R^1$, $R^2$ and $R^3$ are as defined above, Q designates a glycidoxy or epoxycyclohexyl group, and m is 0 or 1. Examples of such compounds are as follows:

γ-glycidoxypropyltrimethoxysilane

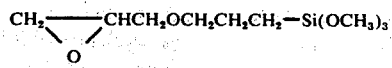

γ-glycidoxypropylmethyldimethoxysilane

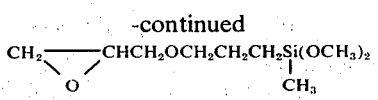

β-(3,4-epoxycyclohexyl)ethyltrimethoxysilane

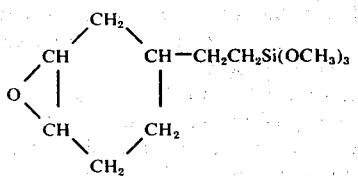

β-(3,4-epoxycyclohexyl)ethylmethyldimethoxysilane

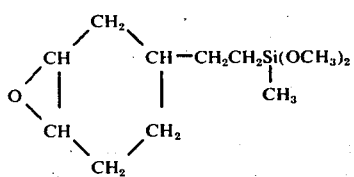

In the carbon-functional silane of the present invention, the combination ratio of the aminoalkylalkoxysilane to the epoxyalkylalkoxysilane may be determined within the range so that the aminoalkylalkoxysilane might be contained in an amount of from 20% to 70% by weight, preferably 30% to 60% by weight to the total amount of the carbon-functional silane.

In case the amount of the aminoalkylalkoxysilane is less than 20% by weight or more than 70% by weight, the scratch resistance of the surface-treated plastic article is poor and the desired characteristics cannot be attained in the product.

The coating composition of this invention, as described above, comprises dissolving the partially-hydrolyzed carbon-functional silane in an organic solvent, and the partial hydrolysis of the carbon-functional silane is preferably carried out in that solvent. Thus, it is indispensable that the solvent to be used in this invention should possess an ability to dissolve both the silane therein simultaneously. The aminoalkylalkoxysilane is soluble in alcohols, ketones and ethers, and the epoxyalkylalkoxysilane is soluble in almost all organic solvents. Accordingly, alcohols, ketones and ethers are preferably used as the solvent in this invention.

The alcohols generally used are such aliphatic or alicyclic alcohols having 1–8 carbon atoms as methanol, ethanol, iso-propanol, n-butanol, secbutanol, isobutanol, 2-ethyl hexanol and cyclohexanol. The ketones are represented by a general formula $R_1COR_2$ wherein $R_1$ and $R_2$ is an alkyl group having 1–4 carbon atoms, exemplified by acetone, methyl ethyl ketone, methyl iso-butyl ketone and the like. There may be used other ketones such as cyclohexanone, methyl cyclohexanone, di-acetone alcohol and the like. Examples of the ethers are ethyl ether, iso-propyl ethyl, n-butyl ether and the like, represented by the general formula $R_3OR_4$ wherein $R_3$ and $R_4$ is an alkyl group having 2–4 carbon atoms.

Other examples of the ethers are ethylene glycol mono alkyl ether, propylene glycol mono alkyl ether, diethylene glycol mono alkyl ether and dipropylene glycol mono alkyl ether wherein "alkyl" is meant as the group having 1–4 carbon atoms. Heterocyclic ethers, for example, m-and p-dioxane, may be used in this invention. A suitable solvent which does not swell or dissolve a thermoplastic resin-molded article is chosen from among the above organic solvents depending on the kind of the plastic molded article. In general, in order to control the evaporation rate of the solvent or to improve the casting property of the resulting coating composition, some solvents with a different boiling point may be mixed or a solvent having a good wettability to plastics may be chosen.

The concentration of the partially-hydrolyzed carbon-functional silane in the coating composition solution of this invention is adjusted within such a range as the solution will bring about satisfactory results with respect to both the storage stability of the solution and the performance of the coating layer.

More specifically, it is preferred that the concentration is adjusted to 5–20% by weight.

If the above organic solvent solution of the carbon-functional silane of this invention, which comprises the aminoalkylalkoxysilane and epoxyalkylalkoxysilane, is coated on a thermoplastic resin-molded article as it is, a coating layer having a high scratch resistance cannot be achieved. In order to attain the intended surface-treatment in the molded article, it is necessary that the carbon-functional silane selected from the group consisting of (a) the mixture of the aminoalkylalkoxysilane and the epoxyalkylalkoxysilane and (b) the reaction product thereof, as designated before, be converted into the partially-hydrolyzed carbon-functional silane in advance by adding water to the above solution and heating the same under agitation.

In case the degree of the partial hydrolysis is insufficient, blushing is caused to occur in the resulting coating or the hardness is insufficient. On the other hand, in case the hydrolysis is advanced excessively, gelation is caused to occur or the storage stability is inferior. The degree of the hydrolysis is influenced by the amount of water added, the heating temperature and the heating time. Generally speaking, the amount of water to be added to effect the carbon-functional silane of this invention is selected within the range less than the one calculated stoichiometrically to hydrolyze the carbon-functional silane into the corresponding silanol. More specifically, it is preferred that the amount of water is adjusted to 10% to 40% by weight of the total amount calculated stoichiometrically.

The heating temperature is changeable depending on the boiling point of the solvent used, but it is generally within a range of from a room temperature to 100°C. The heating time is preferably 10 to 100 minutes in general, though it is carried to some extent depending on the heating temperature.

The partially-hydrolyzed carbon-functional silane adapted for use in this invention is generally produced to effect the carbon-functional silane by selecting from the group consisting of (a) a mixture of an aminoalkylalkoxysilane and an epoxyalkylalkoxysilane and (b) a reaction product thereof with water. Moreover, in this invention there may preferably be used a mixture in which a partially-hydrolyzed aminoalkylalkoxysilane or epoxyalkylalkoxysilane is combined with an unhydrolyzed aminoalkylalkoxysilane or epoxyalkylalkoxysilane and a mixture of a partially-hydrolyzed aminoalkylalkoxysilane and a partially-hydrolyzed epoxyalkylalkoxysilane. Accordingly, embodiments using these mixtures as the partially-hydrolyzed carbon-functional silane are within the scope of this invention.

The coating composition solution of this invention which has been subjected to the partial hydrolysis in a manner as described above should be uniformly coated on a plastic molded article. For this purpose there may be employed any of the customary methods such as dipping, spraying, brushing, flow-coating and roll-coating methods. In this case, the concentration of the solution should be adjusted appropriately depending on the coating method actually adopted. However, too high a concentration results in the reduction of the storage stability of the soluton, and at too low a concentration the thickness of the coating layer obtained by one coating operation is small and performance of the resulting coating layer is inferior. It is preferred that the solution is coated on a molded article in such an amount that the finished thickness of the coating layer is 1–10$\mu$, preferably 3–10$\mu$. When the finished thickness of the coating layer is smaller than 1$\mu$, the scratch resistance of the resulting coated article is substancially low, and when the thickness of the coating layer exceeds 10$\mu$, cracks are readily formed by expansion or shrinkage of the molded article.

The coating composition incorporated on the thermoplastic resin-molded article is set at a room temperature for several minutes and then heated, whereby a tough coating is formed on the molded article. This heating is accomplished, for example, by treating the coated article in a hot air heating furnace maintained at 50°–140°C, for more than 10 minutes. In addition, heating methods such as a far-infrared ray radiation heating method and a microwave heating method are effective. In the case of the microwave heating method, satisfactory results can be obtained by conducting the heating for only 1 to 5 minutes.

The thermoplastic resin-molded article which has been surface-treated according to the above-mentioned method of this invention has a scratch resistance comparable to that of glass, and it has sufficient utility as it is. However, if it is desired to impart high adhesion in order that the coated article has sufficient water resistance, weatherability and heat cycle, it is effective to treat the molded article, prior to the coating, with a dilute solution of an organic silicon compound containing a functional group-substituted hydrocarbon group such as an aminoalkylalkoxysilane or an epoxyalkylalkoxysilane or an organic titanate compound. More specifically, the adhesion of the coating layer can be highly improved by a simple treatment comprising contacting the surface of the molded article to be coated with a solution of 0.5–5% of the organic silicone compound or organic titanate compound in a solvent incapable of swelling the molded article, such as aliphatic hydrocarbons and alcohols, and air-drying the treated surface for 1–10 minutes.

In accordance with the treating method of this invention, which has been detailed hereinabove, a plastic molded article is provided with a coating layer having a very high scratch resistance. In addition, it has been found that this coating layer has the unusual property that the surface resistivity of the molded article treated according to the method of this invention is reduced to a level below $10^{11}\Omega$, and that it exhibits a very excellent antistatic property. As described hereinafter, the surface coating obtained according to the treating method of this invention is formed by the curing reaction of a partially hydrolyzed carbon-functional silane, and therefore, it has good water resistance and solvent resistance. Accordingly, the antistatic property of this coating layer can be retained almost permanently. In view of the fact that the antistatic effect provided by conventional known methods decreases with the lapse of time, this effect is peculiar and gives great advantages in practical applications.

If it is considered that high scratch resistance is imparted according to the mathod of this invention, then amorphous thermoplastic resin-molded articles, namely, transparent plastic articles of such as polycarbonate, polymethyl methacrylate, cellulose butyrate, polyvinyl chloride and polystyrene, can be mentioned as preferable materials to be treated according to the method of this invention. However, if it is considered in combination that a permanent antistatic property can be imparted, it will readily be understood that plastic materials to be treated according to this invention are not limited to those exemplified above. Thus, this invention provides a very useful method of the surface treatment of thermoplastic resin-molded articles, which is applicable to molded articles of various plastics including even non-transparent plastics.

In this invention, the mar resistance or abrasion resistance is evaluated by the mar resistance test method (ASTM D673) and the Taber abrasion test method (ASTM D1044). In the mar resistance test, 400 g or 800 g carborundum having size of 48–80 mesh is let to fall naturally on the surface of a test sample inclined by an angle of 45° from a certain height (about 63.5 cm) at a certain rate (200–250 g/min), to thereby form abraded spots on the surface. Then, light is projected on the surface of the test sample at an angle of 45°, and the intensity of reflection in the direction of 45° is determined. The resistance is evaluated based on the percent ratio of the intensity of reflection after the mar resistance test to the intensity of reflection before the test. In the Taber abrasion test, a pair of CS-10 wheels are employed and samples are subjected to abrasion 50 times under a load of 1000 g. The abrasion resistance is evaluated based on the percent ratio of the transmittance of parallel rays after the abrasion of the transmittance of parallel rays before the abrasion.

The scratch resistance of polycarbonate molded articles coated with conventional coating materials and of polycarbonate molded articles surface-treated according to the method of this invention were tested and compared according to the above-mentioned evaluation methods. Results are shown in Table 1, in which the properties of a soda glass sheet and an untreated polymethyl methacrylate sheet are also shown for comparison.

In case the mar resistance measured in the mar resistance test is less than 90%, mars are conspicuous. At the mar resistance test using 400 g of the carborundum, some of the known coating materials such as silicone, amino-alkyd resin and two-component urethane resin, exhibit values of mar resistance exceeding 90% and are deemed to have a considerably high resistance. However, at the mar resistance test using 800 g of the carborundum, each of them exhibits a value of the mar resistance below 90% and mars are conspicuous on the surface.

Also in the Taber abrasion test, when the measured value is lower than 90%, abrasion is conspicuous on the sample surface. None of the conventional coating materials exhibit satisfactory results in the Taber abrasion test.

In contrast in either the mar resistance test or the Taber abrasion test, the coating layer prepared from the coating composition of this invention exhibits results comparable to those of soda glass, and scratches are hardly observed in the tested areas. When these results are compared with results of the tests made on the uncoated polycarbonate sheet or uncoated polymethyl methacrylate sheet, it is apparent that the effects attained by this invention are very superior.

Table 1

| Material of Molded Article | Kind of resin | Coating material Tradename | Mar Resistance (%) at Mar Resistance Test 400 g | 800 g | Abrasion Resistance (%) at Taber Abrasion Test |
|---|---|---|---|---|---|
| Polycarbonate | acrylic | ACLOSE SUPER (1) | 25.8 | 5.9 | 29.9 |
| " | " | ACRYACE (2) | 33.4 | 12.3 | 34.0 |
| " | " | RECRACK-22 (3) | 17.7 | 4.7 | 51.6 |
| " | " | RECRACK-SSS (3) | 26.6 | 5.3 | 34.1 |
| " | modified acrylic | ACRYLURETHANE (2) | 25.5 | 7.2 | 42.2 |
| " | " | METHALACK-V (3) | 22.5 | 5.7 | 52.0 |
| " | aminoalkyd | CASHEW COAT (2) | 70.1 | 32.0 | 12.6 |
| " | " | CASHEW KARATTO 3100 (2) | 89.5 | 65.1 | 27.1 |
| " | " | POLYMO 200 (3) | 97.6 | 78.3 | 16.6 |
| " | " | NEO-HALBO L110 (3) | 83.7 | 46.9 | 10.8 |
| " | two-component urethane | POLITAN 1000 (1) | 53.0 | 16.2 | 43.2 |
| " | " | V-TOP (1) | 40.2 | 9.5 | 33.7 |
| " | " | CASHEW STRONE 500 (2) | 32.4 | 8.5 | 25.3 |
| " | " | CASHEW STRONE 570 (2) | 51.6 | 6.8 | 15.9 |
| " | " | PLASLAC 220 (2) | 31.6 | 6.6 | 28.7 |
| " | " | PLASLAC 230 (2) | 93.7 | 64.6 | 39.5 |
| " | " | ACRETAN 1000-XI (3) | 50.3 | 11.4 | 45.0 |
| " | one-component urethane | CASHEW PREAM (2) | 48.3 | 13.0 | 46.8 |
| " | two-component epoxy | CERACOAL 1000 (3) | 54.3 | 14.3 | 65.7 |
| " | " | EPOLMINE 600 (4) | 90.4 | 55.4 | 27.6 |
| " | " | NEOGOSE 200 (4) | 35.1 | 8.2 | 60.4 |
| " | silicone | GLASS RESIN 100 (5) | 96.3 | 82.8 | 75.3 |
| " | " | GLASS RESIN 650 (5) | 95.8 | 94.6 | 77.0 |
| " | — | — | 9.0 | 3.5 | 67.1 |
| " | | coating composition obtained in Example 2 | 99.3 | 97.5 | 97.2 |
| Soda Glass | — | — | 100.0 | 97.7 | 97.7 |
| Polymethyl methacrylate | — | — | 55.4 | 14.1 | 74.8 |

Notes:
(1) product of Dai Nippon Toryo Co., Ltd.
(2) Product of Cashew Co., Ltd.
(3) Product of Fujikura Kasei Co., Ltd.
(4) Product of Shinto Paint Co., Ltd.
(5) Product of Owens Co., U.S.A.

Table 2

| Kinds and Combinations of organic silicon compounds A | B | Appearance of Coating | Degree of Occurrence of Abrasion at Taber Abrasion Test |
|---|---|---|---|
| aminoalkylalkoxysilane (I) | acryloxyalkylalkoxysilane | good | X |
| aminoalkylalkoxysilane (I) | vinylalkoxysilane (I) | no gloss | X |
| aminoalkylalkoxysilane (I) | vinylalkoxysilane (II) | no gloss | X |
| epoxyalkylalkoxysilane | acryloxyalkylalkoxysilane | white turbidity | X |
| epoxyalkylalkoxysilane | vinylalkoxysilane (I) | white turbidity | X |
| epoxyalkylalkoxysilane | aminoalkylalkoxysilane (I) | good | O |

Note 1: the weight ratio of A/B is 7/3.
Note 2:
aminoalkylalkoxysilane (I): N-(trimethoxysilylpropyl) ethylene diamine
aminoalkylalkoxysilane (II): N-(dimethoxysilylpropyl) ethylene diamine
vinylalkoxysilane (I): vinyltriethoxysilane
vinylalkoxysilane (II): vinyl-tris-(β-methoxyethoxy)-silane
acryloxyalkylalkoxysilane: γ-methacryloxypropyltrimethoxysilane
epoxyalkylalkoxysilane: γ-glycidoxypropyltrimethoxysilane The test results shown in Table 2 demonstrate clearly that the combination of the aminoalkylalkoxysilane and epoxyalkylalkoxysilane of this invention are much more effective than combinations of other organic silicon compounds. In Table 2, properties of polycarbonate molded articles surface-treated according to the method of this invention are compared with polycarbonate molded articles coated with conventional other coating materials containing organic silicon compounds. The symbol "O" in Table 2 means that abrasions are not conspicuous at the Taber abrasion test, and the symbol "X" indicates that abrasions are conspicuous in the same test. As is seen from the results shown in Table 2, among various combinations of organic silicon compounds, only the combination of the aminoalkylalkoxysilane and epoxyalkylalkoxysilane specified in this invention gives good results. This fact is a very unusual one.

It is considered that the above peculiar effect attained in this invention is due to the following occurrences. Namely, the alkoxy group of the carbon-functional silane of this invention is silanolated by the hydrolysis and is then dehydration-condensed to form a two-dimensional or three-dimensional structure. Simultaneously, the addition reaction is caused to occur between the epoxy groups and the primary and/or secondary amine groups which are included in carbon-functional silane, whereby the cross-linked structure is further developed to a higher degree. In combinations other than those included in the scope of this invention, no reaction is caused to occur between organic silicon compounds, and, it is believed that the performance of the coating layer is inferior or even when a transparent coating layer is formed, its abrasion or mar resistance is inferior.

A method for forming a coating material only by dehydration condensation of silanols has been known from, for instance, the specification of U.S. Pat. No. 3,451,838. The method proposed in said specification comprises coating on the surface of a molded article a partially co-hydrolyzed product of a mixture of methyl-triethoxysilane and phenyltriethoxysilane and curing the coating material. As is seen from properties of Glass Resin 100 and Glass Resin 650 (trademark for a silicone resin paint manufactured by Owens Co., U.S.A.) in Table 1, the properties of the coating layer formed according to this known method are inferior to the coating layer formed from the coating composition of this invention, especially in the results at the Taber abrasion test. In short, it is impossible to form a coating having a good scratch resistance only by the dehydration-condensation of silanols.

In this invention the addition reaction between the epoxy and amine groups is allowed to occur at room temperature in the absence of a special catalyst, and this reaction is highly accelerated by heating. Therefore, this invention is advantageous in that the method of this invention can be conducted practically with ease.

Still in addition, the thermoplastic resin-molded article treated according to the method of this invention has such a low surface resistivity as to be less than $10^{11}\Omega$. Therefore, the resulting coating layer exhibits a permanent antistatic property, and sand dusts and the like that causes in many cases, to form scratches, do not adhere to the surface of the molded article. Accordingly, the coating layer formed according to the method of this invention can retain transparency almost permanently.

Moreover, the coating layer formed according to the method of this invention has a resistance against such solvents as methylene chloride, acetone, ethyl acetate and toluene, as well as contamination resistance. Accordingly, the coating of this invention is free of occurrence of devitrification or formation of dirty spots, and beautiful appearance and transparency of the substrate can be well retained.

As detailed hereinabove, thermoplastic resin-molded articles treated with the coating composition of this invention have such a high scratch resistance as not attainable by the conventional coating materials and have, in combination, good antistatic property and solvent resistance. Therefore, they can be broadly used in various fields as glass substitutes and have very high practical value.

This invention will now be illustrated in more detail by reference to Examples.

EXAMPLE 1

In a 200 cc-capacity beaker, 90 g. of dehydrated iso-butanol and 0.806 g. (0.0447 mole) of water were weighed and mixed uniformly. Then, 5 g. (0.0234 mole) of N-(trimethoxysilylpropyl) ethylene diamine was gradually added under agitation to the mixture and dissolved therein. Then, 5 g. (0.0212 mole) of γ-glycidoxypropyltrimethoxysilane was gradually added to the solution under agitation. When the solution became homogeneous as a whole, the agitation was stopped. The solution was transferred into a sealable glass vessel, and the glass vessel was sealed and allowed to stand still in an air bath maintained constantly at 50°C. for 90 minutes, to effect the partial co-hydrolysis and aging. Then, the temperature was lowered to a room temperature, and the whole of the resulting reaction product was diluted with 25 g. of dipropylene glycol monomethyl ether. The so formed paint was characterized by a resin content of 6% by weight and a viscosity of 5.0 entipoises, and the storage stability of the paint was such that even when it was stored in an air bath maintained constantly at 50°C. for more than 30 days, no change was brought about.

A disc-like injection molded article of a polycarbonate resin was washed well with a neutral detergent, dried and dipped in a bath of the above paint. The molded article was taken out of the bath and air-dried by maintaining it horizontally in air for 5 minutes. Then, the curing was conducted in a hot air-circulating thermostatic oven maintained at 120°C. for 2 hours. The resulting cured coating layer had a thickness of 3–4μ and a pencil hardness of grade H. The mar resistance was 99.3% at the mar resistance test using 400 g. of sand and 92.0% at the mar resistance test using 800 g. of carborundum.

At the Taber abrasion test, the cured coating layer exhibited as abrasion resistance of 93.6%. When the coated article was contacted with methylene chloride, acetone, ethyl acetate or toulene for 5 minutes, no change was observed. The surface resistivity of the coating layer was $5.64 \times 10^{10}\Omega$, and it exhibited a good antistatic property. More specifically, when tobacco ash was made to come close to the coating after it had been rubbed with clean dry gauze, it did not attract the ash at all.

EXAMPLE 2

In a 200 cc-capacity beaker, 65 g. of dehydrated iso-butanol and 0.847 g. (0.0526 mole) of water were weighed and mixed uniformly. Then, 7 g. (0.0315 mole) of N-(trimethoxysilylpropyl) ethylene diamine was gradually added to the mixture under agitation, and dissolved therein. Separately, 21 g. of ethyleneglycol monobutyl ether was weighed in a 50 cc-capacity beaker, and 7 g. (0.0296 mole) of γ-glycidoxypropyl-trimethoxysilane was gradually added thereto under agitation and dissolved therein. The solution was gradually added to the above iso-butanol solution under agitation and dissolved therein. When the resulting solution became homogeneous, the agitation was stopped. Then, the solution was transferred to a sealable glass vessel, and the vessel was sealed and allowed to stand still in an air bath maintained constantly at 50°C for 90 minutes to thereby effect the partial co-hydrolysis and aging. Then, the temperature was lowered to a room temperature, and thus was obtained a paint having a resin content of 11.2% by weight and a viscosity of 6.3 centipoises. The storage stability of the paint was such that even when it was allowed to stand still in an air bath maintained constantly at 50°C for more than 30 days, no change was observed.

An extrusion-molded sheet of polycarbonate resin was washed well with a neutral detergent, dried and dipped in a bath of the above paint. Then, it was air-dried by maintaining it in the horizontal direction in air for 5 minutes and then the curing was conducted for 2 hours in a hot air-circulating thermostatic oven maintained at 120°C. The resulting coating layer had a thickness of 5–7μ and a pencil hardness of grade 2H. The mar resistance of the coating layer was 97.5% at the mar resistance test (using 800 g. of carborundum) and the abrasion resistance of the coating layer was 97.2% at the Taber abrasion test. When the coated sheet was contacted with methylene chloride, acetone, ethyl acetate or toluene, no change was observed. When tobacco ash was made to come close to the coating after it had been rubbed with clean dry gauze, it did not attract the ash at all.

EXAMPLE 3

Procedures of Example 1 were repeated by employing N-(dimethoxymethylsilylpropyl) ethylene diamine instead of N-(trimethoxysilylpropyl) ethylene diamine. The resulting coating layer had a thickness of 3–4μ and a pencil hardness of grade H. The mar resistance of the coating layer was 86.0% at the mar resistance test (using 800 g. of carborundum) and the abrasion resistance of the coating layer was 87.4% at the Taber abrasion test.

EXAMPLE 4

Procedures of Example 1 were repeated by conducting the partial co-hydrolysis with use of 0.241 g. (0.0134 mole) of water. The resulting coating layer had a thickness of 3–4μ and a pencil hardness of grade 2H. The mar resistance of the coating layer was 91.0% at the mar resistance test (using 800 g. of carborundum) and the abrasion resistance of the coating layer was 91.4% of the Taber abrasion test.

EXAMPLE 5

Procedures of Example 1 were repeated by employing 0.780 g. (0.0433 mole) of water, 2 g. (0.0090 mole) of N-(trimethoxysilylpropyl)-ethylene diamine and 8 g. (0.0339 mole) of γ-glycidoxypropylmethoxysilane. The resulting coating layer had a thickness of 3–4μ and a pencil hardness of grade H. The mar resistance of the coating layer was 89.5% at the mar resistance test (using 800 g. of carborundum) and the abrasion resistance of the coating layer was 94.8% at the Taber abrasion test.

EXAMPLE 6

Procedures of Example 2 were repeated by conducting the curing for 2–3 minutes by employing a far-infrared ray irradiator instead of conducting the curing for 2 hours in a hot air-circulating thermostatic oven maintained at 120°C. Properties of the resulting coating layer was almost identical with those of the coating obtained in Example 2.

EXAMPLE 7

In a 200 cc-capacity beaker 98 g. of dehydrated n-hexane was weighed, and 2 g. of butyl titanate was added thereto and dissolved therein uniformly. A disc-like injection-molded article of polycarbonate resin was washed well with a neutral detergent, dried and dipped in a bath of the above treating solution. Then, the molded article was air-dried, and dipped in a bath of the paint obtained in Example 2. The molded article was taken out of the bath and air-dried by maintaining it in the horizontal direction in air for 5 minutes, following which the curing was conducted in a hot air-circulating thermostatic oven maintained at 120°C for 2 hours. The resulting coating layer exhibited a very high adherence and other properties of the coating layer were quite equal to those of the coating obtained in Example 2.

EXAMPLE 8

Procedures of Example 2 were repeated by conducting the application of the paint by spraying the paint to an extrusion-molded sheet of a polycarbonate resin with use of a spray gun having a nozzle diameter of 1.1 mm under air pressure of 3.5–4.5 Kg/cm² at a spray distance of 25 cm instead of dipping the molded sheet in the paint bath. The resulting coating layer had a thickness of 7–8μ and the surface was smooth and lustrous. Properties of the resulting coating layer were not different from those of the coating obtained in Example 2.

EXAMPLE 9

An extrusion-molded sheet of a polymethylmethacrylate was washed well with a neutral detergent and dried. Then, it was dipped in a bath of the paint obtained in Example 2, taken out of the bath and air-dried by maintaining it in the horizontal direction in air for 5 minutes, following which the curing was conducted for 2 hours in a hot air-circulating thermostatic oven maintained at 100°C. The resulting coating layer had a thickness of 5–7μ. After the coating had been allowed to stand still at a room temperature for 36 hours, the coating layer had a pencil hardness of grade 2H and the mar resistance was 95.4% at the mar resistance test (using 800 g. of carborundum) and the abrasion resistance was 92.0% at the Taber abrasion test. When the coated sheet was contacted with methylene chloride, acetone, ethyl acetate or toluene for 5 minutes, no change was observed. When tobacco ash was made close to it after it had been rubbed with clean dry gauze, it did not attract the ash at all.

EXAMPLE 10

An injection-molded disc of a polystyrene was well washed with a neutral detergent and dried. It was then dipped in a bath of the paint obtained in Example 2, taken out of the bath and air-dried by maintaining it in the horizontal direction in air for 5 minutes, following which the curing was conducted for 2 hours in a hot air-circulating thermostatic oven maintained at 60°C. The resulting coating layer had a thickness or 5–7μ. After the coating had been allowed to stand at room temperature for 50 hours, its properties were comparable to those of the coating layer obtained in Example 9.

EXAMPLE 11

In a 2000 cc-capacity separable flask, 67.68 g. of dehydrated iso-butanol was weighed, and 69.4 g of N-(trimethoxysilylpropyl) ethylene diamine was added thereto and dissolved therein uniformly. Then, the solution was warmed to 50°C, and 73.8 g. (0.312 mole) of γ-glycidoxypropyltrimethoxysilane was gradually added to the solution under agitation. The solution obtained was maintained constantly at 50°C for 60 minutes to effect additional reaction. Then, a mixture of 12.0 g. (0.667 mole) of water and 12.0 g. of dehydrated isopropanol was added to the solution under agitation, and the solution was maintained at 50°C for 60 minutes, to effect the partial co-hydrolysis and aging. Then, the temperature was lowered to room temperature, and the whole of the resulting reaction product was diluted with 168 g. of ethylene glycol monobutyl ether. The so-formed paint had properties comparable to those of the paint obtained in Example 2.

EXAMPLE 12

In a 2000 cc-capacity separable flask, 676.8 g. dehydrated iso-butanol was weighed, and 69.4 g. (0.312 mole) of N-(trimethoxysilylpropyl) ethylene diamine was added thereto and dissolved therein uniformly. Then, the solution was warmed to 50°C. A mixture of 12.0 g. (0.667 mole) of water and 12.0 g. of dehydrated isopropanol was added to the solution under agitation, and the solution was maintained at 50°C for 60 minutes, to effect the partial hydrolysis. Then, 73.8 g (0.312 mole) of γ-glycidoxypropyltrimethoxysilane was added to the solution under agitation, and the solution was maintained at 50°C for 60 minutes, to effect the partial hydrolysis, addition reaction and aging. Then, the temperature was lowered to room temperature, and the whole of the resulting reaction product was diluted with 168 g. of ethyleneglycol monobutylether. The so-formed paint had properties comparable to those of the paint obtained in Example 1.

What is claimed is:

1. A coating composition for applying on a surface of a thermoplastic resin-molded article and forming a transparent coating layer having scratch resistance and antistatic properties, which comprises:
   A. a partially-hydrolyzed carbon-functional silane derived from a carbon-functional silane selected from the group consisting of (a) a mixture of from 20 to 70 parts by weight of an aminoalkylalkoxysilane represented by a formula (I)

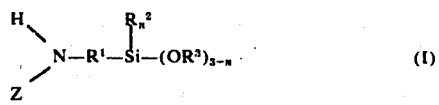

wherein $R^1$ stands for a divalent hydrocarbon group having 1 to 4 carbon atoms, $R^2$ and $R^3$ designate a monovalent hydrocarbon radical having 1 to 4 carbon atoms, z stands for a hydrogen atom or an aminoalkyl group, and n is 0 or 1, and from 80 to 30 parts by weight of an epoxyalkylalkoxysilane represented by a formula (II)

wherein $R^1$, $R^2$ and $R^3$ are as defined above, Q designates a glycidoxy or epoxycyclohexyl group, and m is 0 or 1 and (b) a reaction product thereof, which is obtained by effecting said carbon-functional silane with water in an amount of 10% to 40% of the amount calculated stoichiometrically to hydrolyze said carbon-functional silane into the corresponding silanol, and
   B. an organic solvent which may dissolve said partially-hydrolyzed carbon-functional silane without swelling or dissolving of said thermoplastic resin-molded article.

2. A coating comprising according to claim 1, wherein the organic solvent is at least one member selected from the group comprising alcohols, ketones and ethers.

3. A coating composition according to claim 1, wherein the organic solvent is at least one member selected from the group comprising aliphatic or alicyclic alcohols, aliphatic or alicyclic ketones and aliphatic or heterocyclic ethers.

4. A coating composition for applying on a surface of a thermoplastic resin-molded article and forming a transparent coating layer having scratch resistance and antistatic properties, which comprises:
   A. a partially-hydrolyzed carbon-functional silane derived from a carbon-functional silane selected from the group consisting of (a) a mixture of from 30 to 60 parts by weight of an aminoalkylalkoxysilane represented by a formula (I)

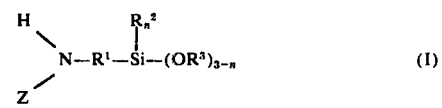

wherein $R^1$ stands for a divalent hydrocarbon group having 1 to 4 carbon atoms, $R^2$ and $R^3$ designate a monovalent hydrocarbon radical having 1 to 4 carbon atoms, z stands for a hydrogen atom or an aminoalkyl group, and n is 0 or 1, and from 70 to 40 parts by weight of an epoxyalkylalkoxysilane represented by a formula (II)

wherein $R^1$, $R^2$ and $R^3$ are as defined above, Q designates a glycidoxy or epoxycyclohexyl group, and m is 0 or 1 and (b) a reaction product thereof, which is obtained by effecting said carbon-functional silane with water in an amount of 10% to 40% of the amount calculated stoichiometrically to hydrolyze said carbon-functional silane into the corresponding silanol, and
   B. an organic solvent which may dissolve said partially-hydrolyzed carbon-functional silane without swelling or dissolving of said thermoplastic resin-molded article.

* * * * *